(12) United States Patent
Touvelle et al.

(10) Patent No.: US 6,652,737 B2
(45) Date of Patent: *Nov. 25, 2003

(54) PRODUCTION OF NAPHTHA AND LIGHT OLEFINS

(75) Inventors: Michele S. Touvelle, Baton Rouge, LA (US); Darryl P. Klein, Ellicott City, MD (US); Tan-Jen Chen, Kingwood, TX (US); Luc R. Martens, Meise (BE); Edward S. Ellis, Basking Ridge, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/897,196

(22) Filed: Jul. 2, 2001

(65) Prior Publication Data

US 2002/0063082 A1 May 30, 2002

Related U.S. Application Data

(60) Provisional application No. 60/220,091, filed on Jul. 21, 2000.

(51) Int. Cl.$^7$ .................. C10G 35/06; C10G 35/085
(52) U.S. Cl. .................. 208/137; 208/134; 208/133; 208/138; 208/14; 208/66; 585/648; 585/650; 585/651; 585/518; 585/700; 585/940
(58) Field of Search .................. 208/66, 133, 134, 208/137, 138; 585/648, 650, 651, 518, 700, 940

(56) References Cited

U.S. PATENT DOCUMENTS

| | | | |
|---|---|---|---|
| 3,617,485 A | 11/1971 | Kittrell | 208/59 |
| 3,617,511 A | 11/1971 | Jenkins et al. | 208/112 |
| 3,631,117 A | 12/1971 | Kovach et al. | 260/666 |
| 3,779,897 A | 12/1973 | Wrench et al. | 208/89 |
| 3,943,052 A | 3/1976 | Kmak et al. | 208/140 |
| 3,953,368 A | 4/1976 | Sinfelt | 252/466 |
| 4,018,670 A | 4/1977 | Sinfelt et al. | 208/140 |
| 4,046,673 A | 9/1977 | Paynter et al. | 208/140 |
| 4,134,823 A | 1/1979 | Bertolacini et al. | 208/65 |
| 4,140,626 A | 2/1979 | Bertolacini et al. | 208/216 |
| 4,224,192 A | 9/1980 | Foster et al. | 252/466 B |
| 4,783,575 A | 11/1988 | Schmidt et al. | 585/748 |
| 4,834,866 A | 5/1989 | Schmidt | 208/65 |
| 4,956,075 A | 9/1990 | Angevine et al. | 208/120 |
| 5,015,614 A | 5/1991 | Baird, Jr. et al. | 502/250 |
| 5,026,950 A | 6/1991 | Schmidt et al. | 585/737 |
| 5,334,792 A | 8/1994 | Del Rossi et al. | 585/314 |
| 5,345,026 A | 9/1994 | Chang et al. | 585/700 |
| 5,463,155 A | 10/1995 | Galperin et al. | 585/310 |
| 5,763,731 A | 6/1998 | McVicker et al. | 585/737 |
| 5,770,042 A | 6/1998 | Galperin et al. | 208/65 |
| 5,811,624 A | 9/1998 | Hantzer et al. | 585/700 |
| 5,888,922 A | 3/1999 | Galperin | 502/163 |
| 5,906,728 A | 5/1999 | Iaccino et al. | 208/61 |
| 5,925,239 A | 7/1999 | Klein et al. | 208/213 |
| 5,928,498 A | 7/1999 | McVicker et al. | 208/213 |
| 5,935,420 A | 8/1999 | Baird, Jr. et al. | 208/213 |
| 5,993,642 A | 11/1999 | Mohr et al. | 208/46 |
| 6,221,240 B1 | 4/2001 | Klein et al. | 208/213 |

OTHER PUBLICATIONS

Weitkamp, et al., in Structure and Reactivity of Modified Zeolites, Elsevier (Adam), 279–90, (1984). –No month.
Sergienko, et al., Khim. Geol. Nauk., 2, 65–70 (1976). –No month.
Schultz and co–workers (Proc. 5th Intl. Catal. Congr., North–Holland Publ. (Aidam), v.2, 1229–39, (1973)). –No month.
Egan, et al., J. Amer. Chem. Soc., 84, 1204–12 (1962). –No month.
Gault, et al., Adv. Catal., 30, 1–95, (1981). –No month.

*Primary Examiner*—Nadine G. Norton
(74) *Attorney, Agent, or Firm*—Gerard J. Hughes; Jeremy J. Kliebert

(57) ABSTRACT

Disclosed is a method for treating naphtha. The method comprises providing naphtha feed, and the naphtha feed comprises naphthene ring-containing compounds. The naphtha feed is contacted with a ring opening catalyst containing a Group VIII metal under conditions effective to ring open the naphthene rings to form a ring opened product. The ring open product can then be contacted with a catalytic cracking catalyst under effective cracking conditions to form an olefin product. The olefin product will be particularly high in ethylene and propylene content.

14 Claims, No Drawings

PRODUCTION OF NAPHTHA AND LIGHT OLEFINS

CROSS REFERENCE TO RELATED APPLICATION

This case claims benefit of U.S. Provisional Patent Application 60/220,091 filed Jul. 21, 2000.

FIELD OF THE INVENTION

This invention relates to a method for treating naphtha and making light olefins from the treated naphtha. In particular, this invention relates to the use of a naphthene ring opening catalyst to pretreat naphtha feed, then subjecting the ring opened naphtha to a catalytic cracking process to form light olefin product.

BACKGROUND OF THE INVENTION

There is an increasing demand for light (i.e., $C_2$ to $C_4$) olefin products such as ethylene and propylene, which are useful in polymer processes such as polymerization. The demand for light olefins is growing steadily and is expected to continue growing for the foreseeable future. Olefins are formed in a variety of hydrocarbon conversion processes. Steam cracking and catalytic cracking of naphtha feed are examples of processes to obtain light olefin product. For example, U.S. Pat. No. 5,993,642, discloses hydrocarbon conversion processes using zeolite bound zeolite catalysts. One such process involves the catalytic cracking of a naphtha feed to produce light olefins at typical temperatures of from about 500° C. to about 750° C.

U.S. Pat. No. 5,770,042 discloses a process which includes ring opening naphtha feed to convert naphthenes in the feed to paraffins. A non-acidic catalyst is used for ring opening, and the paraffins are subsequently isomerized over an acidic catalyst to an isoparaffin product.

The known procedures are either not concerned with producing light olefin in the main product, or they are limited in the amount of olefin product that can be made. Low conversion to light olefins is believed to result at least in part from the high naphthene and aromatics concentrations present in the naphtha feed since these components do not easily convert into desirable light olefin products. There is, therefore, a need for processes for forming light olefin products from naphthas containing naphthenes and aromatics.

SUMMARY OF THE INVENTION

In one embodiment, the invention relates to a method for treating naphtha, making olefin product from the treated naphtha, and the products associated therewith. The method comprises contacting a naphtha feed containing naphthene ring-containing compounds with a catalytically effective amount of catalyst capable of opening a ring at a teriary bond and containing at least one Group VIII metal. Preferably the group VIII metal is Ir.

In another embodiment, it is preferred that the naphtha feed is contacted with a catalytically effective amount of a polymetallic catalyst, preferably a polymetallic catalyst comprising Ir under catalytic conversion conditions. The polymetallic catalyst more preferably comprises Ir in combination with at least one metal selected from the group consisting of Pt, Rh and Ru, and the conditions are effective to ring open the naphthene rings and form a ring opened product.

In preferred embodiments, the Ir is present in a range of from about 0.3 to about 2.0 wt. %. It is also preferred that the Pt, Rh, or Ru be present in a range of from about 0.001 to about 2.0 wt. %. In a particularly preferred embodiment, the Ir is combined with Pt.

The naphthene ring opening catalyst may be supported on alumina, silica, zirconia, titania, any inorganic refractory oxide, or a combination thereof. Generally, low acidity supports are preferred, and in this regard the support may be modified by the addition of an alkali or alkaline earth metal, preferably Ba.

Ring opening is preferably carried out at a temperature of from about 150° C. to about 400° C.; a total pressure from about 0 to about 3,000 psig, a liquid hourly space velocity from about 0.1 to about 10 V/V/Hr, a hydrogen treat gas rate from about 500 to about 10,000 standard cubic feet per barrel (SCF/B); or various combinations thereof. The liquid hourly space velocity is based on the volume of feed per volume of catalyst per hour, i.e., V/V/Hr.

The preferred naphtha feed to be treated has an initial and final boiling point within the range of about 0° C. to about 230° C. It is preferably provided at a sulfur content of less than 1 ppm.

The ring opened product is particularly effective for use as feed to a catalytic cracking unit. In this regard, the ring opened product is contacted with a catalytically effective amount of a catalytic cracking catalyst under effective cracking conditions to form an olefin product. Preferred cracking catalysts comprise large or medium pore zeolites. The olefin product is particularly high in ethylene and propylene content.

DETAILED DESCRIPTION OF THE INVENTION

In one embodiment, the invention relates to a process capable of providing a large quantity of light olefin product from a naphtha feed. The light olefin product is particularly high in ethylene and propylene content. The process involves ring opening the naphthenic rings of naphthenic ring-containing compounds in the naphtha feed to form paraffins.

As used herein, a naphthene or a naphthenic ring-containing composition refers to a cycloalkane or a composition containing at least one cycloalkane ring in its structure. For example, the term can refer to either a $C_5$ or $C_6$ ring-membered cycloparaffin. The cycloparaffin can also include various side chains, particularly one or more alkyl side chains of 1–10 carbons. In addition the cycloparaffin can be attached or fused to other ring structures, forming two or three membered ring compounds. The additional ring members can be saturated or unsaturated, as long as at least one ring of the complete structure contains a tertiary carbon. The ring structure containing the tertiary carbon is preferably saturated. Such a structure may be represented by one or more compounds selected from the group of naphthalenes, indenes, fluorenes, phenanthrenes, anthracenes, acenaphthalenes, and biphenylenes, including partially and completely saturated analogs of such compounds, wherein at least one ring of the compound contains a tertiary carbon, and preferably, the tertiary carbon-containing ring is saturated.

Naphtha feedstream for ring opening will typically contain a mix of hydrocarbons having one or more of the naphthene ring-containing compositions, and the naphthene ring-containing compositions preferably contain at least one alkyl substituent. Preferably, the feedstream will comprise at least about 5 vol. % of at least one naphthenic ring-containing compound more preferably at least about 25 wt.

%, most preferably at least about 50 wt. %. Typically the feedstream will comprise from about 5 to about 85 vol. % of at least one naphthenic ring-containing compound.

In a more preferred embodiment, the hydrocarbon containing the naphthene ring compositions which are to be opened will include $C_5$ naphthene ring compounds which do not include additional ring members. Non-limiting examples of these compounds include cyclopentane, methylcyclopentanes, ethylcyclopentanes, propylcyclopentanes, butylcyclopentanes, and pentylcyclopentanes. It is also preferred that the hydrocarbon containing the naphthene ring compositions which are to be opened include $C_6$ ring compounds which do not include additional ring members. Non-limiting examples of these compounds include cyclohexane, methylcyclohexanes, ethylcyclohexanes, propylcyclohexanes, butylcyclohexanes, and pentylcyclohexanes. The naphtha feeds used in this invention typically further comprise paraffins, naphthenes, and aromatics, and may comprise olefins and numerous other hydrocarbon compounds.

Naphtha feeds may be obtained from any appropriate source. Non-limiting examples of naphthas which may be utilized include straight-run naphthas, particularly light straight run naphtha, natural gasoline, synthetic naphthas, thermal gasoline, catalytically cracked gasoline, partially reformed naphthas or raffinates from extraction of aromatics. The preferred naphtha feed is a light straight run naphtha. The feed is characterized by having an initial and final boiling point within the boiling point range of a full-range naphtha, preferably an initial and final boiling point within the range of from about 0° C. to about 230° C. It is preferred that the feed be a light naphtha having an initial boiling point of from about 0° C. to about 40° C., preferably from about 0° C. to about 30° C. and a final boiling point from about about 50° C. to about 150° C., preferably from about 55° C. to about 100° C. While the naphtha feed may contain sulfur compounds, preferred naphthas contain sulfur in an amount less than about 100 parts per million (ppm) by weight on an elemental basis, more preferably less than about 50 ppm, and most preferably less than about 1 ppm, based on the weight of the feed. A naphtha having more than about 1 ppm sulfur may be pretreated to remove sulfur and other contaminants, to saturate aromatics, or for some combination thereof. Pretreatment of this nature may be accomplished by hydrotreating, hydrorefining or hydrodesulfurization processes capable of providing a naphtha having less than about 100 ppm sulfur on an elemental basis, based on the weight of the feed. Sorbents, including regenerable and non-regenerable catalytically active sulfur traps, capable of providing a naphtha having less than 100 ppm sulfur on an elemental basis, based on the weight of the feed may also be used to remove sulfur from the naphtha.

Non-limiting examples of naphtha pretreatment processes capable of providing a naphtha having less than about 100 ppm sulfur on an elemental basis are disclosed in B. C. Gates, et al., *Chemistry of Catalytic Processes,* McGraw-Hill, 1979, pp. 390–433 and in U.S. Pat. Nos. 5,935,420; 5,928,498; and 5,925,239. Preferably, the pretreating step will provide a naphtha feed having low sulfur levels, desirably about 1 ppm or less, more desirably about 0.5 ppm or less. Low feed sulfur levels are believed to prolong the life of the catalyst in the instant process.

It is preferred to have a naphtha feed that is high in alkane and cycloparaffin content, preferably above about 75 wt. %, and more preferably ranging from about 80 wt. % to about 100 wt. %. Although aromatics may also be present, along with various olefinic and other compounds, it is desirable to have an aromatics content of less than 10 wt. % in the naphtha feed. It is desirable to keep the aromatics content low, since they are generally difficult to convert to olefins. The preferred naphtha feed is low in olefin content, preferably below about 20 wt. %, and more preferably ranging from about 0 wt. % to about 10 wt. %. When a naphtha has one or more of an aromatics content and olefins content outside the preferred range, it is within the scope of the invention to separate olefins, aromatics, or both from the naphtha in order to form a preferred naphtha feed. It is also within the scope of the invention to completely or partially saturate aromatics which may be present in the feed in order to form naphthenes for subsequent cracking into olefins. Accordingly, it is preferable to hydrogenate the aromatic compounds to naphthenes by providing the appropriate hydrogenation conditions. Preferred naphtha feed hydrogenation processes provide a naphtha having an aromatics content less than about 20 wt. %, and preferably ranging from about 0 wt. % to about 10 wt. %. Non-limiting examples of such processes are described by A. Stanislaus, et al., "Aromatic Hydrogenation Catalysis: A Review," Catal. Rev.-Sci. Eng., 36(1), 75–123 (1994). Hydrogenation can be accomplished along with the ring opening step, prior to the ring opening step, or by some combination thereof. In some embodiments it may be preferable to separate at least a portion of the aromatics from the naphtha feed and then saturate them with a hydrogenation process capable of saturating at least 50 wt. % of the separated aromatics, based on the total weight of the separated aromatics. In one embodiment, at least a portion of the saturated product is combined with the naphtha feed.

As discussed, one embodiment includes the sequential steps of:

1. a process for opening naphthenic rings present in a naphtha feed in order to form ring-opened naphtha having a greater concentration of paraffinic species than the naphtha feed, and then
2. catalytically cracking the ring-opened naphtha in order to form light olefins.

In accord with the first step, a naphtha feed is contacted with a selective ring opening catalyst to open the naphthenic rings of the naphthenic ring-containing compounds in the naphtha feed to form paraffins. Selectivity for ring opening is related to the propensity for cleavage of a ring bond which results in product molecules having an equivalent number of carbon atoms and at least one less ring than the original molecule, rather than cleavage of a bond which results in a product molecule having fewer carbons than the original molecule. A perfectly selective ring opening process would give only ring bond cleavage to produce molecules having an equivalent number of carbon atoms and at least one less ring than the original molecule. For example, from a hydrocarbon stream containing only single ring naphthenes of n number of carbon atoms, the product from perfect ring opening selectivity would be only paraffins of n number of carbon atoms. Thus, the greater number of product molecules from a ring opening process having an equivalent number of carbon atoms and at least one less ring than the original molecule, the greater the selectivity for ring opening.

Specifically, one aspect of this invention provides a catalyst that is highly selective in converting naphthene feed into paraffin product containing a substantial quantity of linear and less branched paraffins. The invention is particularly beneficial in converting naphthene feed containing a $C_6$ naphthene ring-containing composition, wherein the $C_6$ ring contains at least one tertiary carbon, to a product containing a substantial quantity of linear and less branched paraffin compounds.

As defined herein, compounds having a high degree of linear paraffin functionality have fewer paraffin (i.e., alkyl) side chains and longer paraffin substituents. According to this definition, linear paraffins are the most highly desirable compounds for use as a feed to catalytically crack to light olefins. However, other hydrocarbons compounds that are not strictly linear but have a relatively high degree of linear paraffin functionality are also desirable. For example, a cycloalkane ring compound having a single, linear alkyl side chain has a relatively high paraffin functionality compared to a cycloalkane ring having multiple side chains. By the same definition, an aromatic ring compound having a single, linear alkyl side chain has a relatively high linear paraffin functionality compared to an aromatic ring compound having multiple side chains.

As used herein, a naphthene or a naphthenic ring-containing composition refers to a cycloalkane or a composition containing at least one cycloalkane ring in its structure. For example, the term can refer to either a $C_5$ or $C_6$ ring-membered cycloparaffin. The cycloparaffin can also include various side chains, particularly one or more alkyl side chains of 1–10 carbons. In addition the cycloparaffin can be attached or fused to other ring structures, forming two or three membered ring compounds. The additional ring members can be saturated or unsaturated, as long as at least one ring of the complete structure contains a tertiary carbon. Preferably, the ring structure containing the tertiary carbon is saturated.

Selectively opening the ring structure of naphthenic ring compounds at the tertiary carbon site, referred to herein as tertiary bond cleavage, is desirable because the ring opened product will have a higher degree of paraffin functionality relative to the naphtha feed. The instant catalyst and process are effective in opening $C_6$ naphthenic rings at the tertiary carbon site, an advantage over processes that isomerize the $C_6$ rings to $C_5$ rings and then open the $C_5$ rings. Direct tertiary bond cleavage in a $C_6$ ring generally results in a ring opened product having a higher degree of linear paraffin functionality than the product of tertiary bond cleavage in a $C_5$ ring isomerized from a $C_6$ ring.

The naphthene ring opening catalyst can be any catalyst capable of opening a naphthene ring structure at a tertiary bond. Preferred ring opening catalysts include a catalyst comprising any one of the Group VIII metals or combinations thereof selected from Ru, Rh, Ir and Pt. In a preferred embodiment, the invention is directed to Ir containing ring opening catalysts. The Ir content of these ring opening catalysts may range from about 0.3 to about 2.0 wt. %, preferably from about 0.5 to about 1.5 wt. %, more preferably from about 0.6 to about 1.2 wt. %.

In an alternative embodiment, the invention is directed to polymetallic ring opening catalysts which comprise Group VIII metals. Particularly preferred as the polymetallic Group VIII metal catalysts of this invention are catalysts which comprise Ir in combination with Pt, Rh, or Ru. These particular catalysts have an especially high selectivity for cleaving tertiary carbon bonds. As described herein, a tertiary carbon is a carbon atom that is joined to three other carbon atoms. An advantage of cleaving at a tertiary carbon is that a naphthene ring compound having an alkyl side group attached will be more easily ring opened to a linear alkane. This type of compound is particularly desirable, since it can be more easily cracked in the catalytic cracking process to form a light olefin product.

Preferred polymetallic Group VIII metal catalysts are Pt—Ir, Rh—Ir, and Ru—Ir. Pt—Ir and Rh—Ir are more preferred, and Pt—Ir is most preferred. The Ir content of these catalysts may range from about 0.3 to about 2.0 wt. %, preferably from about 0.5 to about 1.5 wt. %, more preferably from about 0.6 to about 1.2 wt. %, based on the total weight of the catalyst. The content of the second metal in a bimetallic composition may range from about 0.001 to about 2.0 wt. %, preferably from about 0.005 to about 1.5 wt. %, more preferably from about 0.007 to about 1.3 wt. %, and most preferably from about 0.01 to about 1.0 wt. %, based on the total weight of the catalyst. In the case of trimetallic catalysts the loadings of the second and third metals fall in these same ranges with the distribution between the metals ranging from 10 parts/90 parts to 90 parts/10 parts by weight. Preferred catalyst compositions (wt. %, based on the total weight of the catalyst) include 0.01Me-0.9Ir, 0.05Me-0.9Ir, 0.1Me-0.9Ir, and 0.3Me-0.9Ir where Me is at least one of Pt, Rh, and Ru.

The naphthene ring opening catalysts may be supported on any inorganic refractory oxide including alumina, silica, zirconia, titania, and combinations thereof. Low acidity supports like alumina, which has an insubstantial acid character, are particularly preferred in view of their ability to enhance ring opening selectivity favoring the cleavage of tertiary carbon bonds and the suppression of isomerization. In this regard, the support may be modified by the addition of at least one of a Group IA or IIA alkali or alkaline-earth metal preferably selected from Rb, Cs, Mg, Ca, Sr, Ba, and combinations thereof. The alkali or alkaline-earth metal alkali or alkaline-earth metal is preferably present in a range of from about 0.1 to about 50 wt. %, more preferably in a range of from about 0.5 to about 40 wt. %, still more preferably in a range of from about 1 to about 30 wt. %, and most preferably in a range of 2–25 wt. %, based on the weight of the support. Such support modification is described in U.S. Pat. No. 5,015,614. Supports, when employed, preferably have (i) a surface area greater than about 50 $m^2/g$, preferably from about 100 to 700 $m^2/g$, and more preferably from about 100 to 300 $m^2/g$; (ii) a bulk density from about 0.3 to 1 g/ml, preferably from about 0.4 to 0.8 g/ml; (iii) an average pore volume from about 0.2 to 1.1 ml/g, preferably from about 0.3 to 0.8 ml/g; and (iv) an average pore diameter from about 30 to 300 Angstroms.

Naphthene ring opening catalysts may be prepared by conventional techniques utilizing incipient wetness or the absorption of the metal precursors from excess aqueous solution. Suitable metal precursors are the halides, the halometallic acids, nitrates, nitrites, amine halo complexes, amine nitrate complexes, and amine nitrite complexes. Metals deposition from organic solvents may also be practiced using organometallic complexes such acetylacetonates, carbonyls and the like. Decomposition of the deposited complexes may be accomplished thermally in an air, hydrogen, or inert atmosphere by conventional heating, or by the application of microwave or ultrasonic radiation. The naphthene ring opening catalysts may or may not contain Cl depending on the method of synthesis.

The naphthene ring opening catalysts may be activated according to conventional methods. One non-limiting example includes activation by drying in air at a temperature ranging about 300° C. for about 4 to about 24 hours and reducing in-flowing hydrogen at about 200° C. to about 600° C. for about 0.5 to about 24 hours. Drying at temperatures below 200° C. and reducing at about 350 to about 500° C. for about 4 hours are preferred.

Naphtha feed is contacted with a ring opening catalyst under conditions typical of that known in conventional hydrocracking processes. The conditions are such that the $C_5$ and $C_6$ rings of the naphthene compounds are opened when contacted with the catalyst. Suitable process conditions include temperatures from about 150° C. to about 400° C., preferably from about 225° C. to about 350° C., a total pressure from about 0 to 3,000 psig, preferably from about 100 to 1000 psig, more preferably about 100 to 800 psig, a liquid hourly space velocity of about 0.1 to about 10 V/V/Hr, preferably from about 0.5 to about 5 V/V/Hr, and a hydrogen treat gas rate of about 500 to about 10,000 standard cubic feet per barrel (SCF/B), preferably from about 500 to about 3000 SCF/B. Suitable reactor configurations for ring opening include but are not limited to bubbling beds, fixed beds operated in a cocurrent or countercurrent mode, non-fluidized moving beds and fluidized beds.

The ring opened naphtha product will be low in aromatics and naphthenes and rich in paraffins. Although the ring opened naphtha product will vary in composition, typically the product will have at least about 75 wt. % paraffin, preferably at least about 80 wt. % paraffin, more preferably at least about 85 wt. % paraffin, and most preferably at least about 90 wt. % paraffin. The ratio of n-paraffin to iso-paraffin in the product will vary according to the type of feed used, but will generally range in weight ratio from about 0.5 to about 3 wt. %. While the types and amounts of hydrocarbon species in the ring opened product may vary according to the nature of the feed employed, the nature and extent of any feed processing or upgrading employed, the conditions used in the ring opening step, and combinations thereof, the ring opened naphtha product is suitable as a feed for a catalytic cracking process capable of forming light olefins, i.e., step 2.

Accordingly, a light olefin product is formed by catalytically cracking the ring opened naphtha, preferably in a fluidized catalytic cracking unit. Fluidized catalytic cracking ("FCC") is a conventional process for converting hydrocarbon feeds to lighter products. Most FCC units include a reactor and a regenerator in the fluid solids portion of the overall FCC process. There is movement of catalyst between the reactor and regenerator in essentially a continuous, cyclical process. In general, feed is contacted with hot catalyst in the reactor to produce lighter products. During the cracking process, carbonaceous deposits or coke and other contaminants such as metals are deposited on the catalyst resulting in at least a partial deactivation of the catalyst. The deactivated catalyst is separated from the cracked products and sent to the regenerator. The coke deposits are removed from catalyst particles by burning and the regenerated catalyst recycled to the reactor. Heat from the burning coke is typically used to help maintain the desired temperature in the reactor where additional cracking of feed occurs.

The invention is compatible with FCC catalyst stripping in order to remove some of the spent catalyst's adsorbed hydrocarbon. However, the ring-opened naphtha feed may result in less hydrocarbon on the spent catalyst than would be the case for FCC processes using a heavy oil feed. Accordingly, it is within the scope of the invention to not strip or to reduce stripping severity in order to provide sufficient coke on the spent catalyst for combustion during regeneration to heat balance the process. In cases where insufficient coke is present to maintain heat balance, it is within the scope of the invention to add heat to the FCC process by, for example, torch oil combustion in the regenerator.

Any catalyst that is effective in cracking paraffinic compounds to form light olefins can be used in this invention. Conventional cracking catalyst components which can be used are generally amorphous silica-alumina and crystalline silica-alumina. Other materials which can be useful as cracking catalysts are crystalline silicoaluminophosphates such as that described in U.S. Pat. No. 4,440,871 and crystalline metal aluminophosphates such as that described in U.S. Pat. No. 4,567,029.

Large and medium pore zeolites are preferred for use in cracking the ring opened naphtha. Large pore zeolites typically possess an average crystallographic pore dimension of about 7.0 Angstroms and above for their major pore opening. Representative crystalline silicate zeolite cracking catalysts of this type include zeolite X (U.S. Pat. No. 2,882,244), zeolite Y (U.S. Pat. No. 3,130,007), zeolite ZK-5 (U.S. Pat. No. 3,247,195), and zeolite ZK-4 (U.S. Pat. No. 3,314,752). Naturally occurring zeolites such as chabazite, faujasite, mordenite, and the like can also be used. Also useful are silicon-substituted zeolites, such as those described in U.S. Pat. No. 4,503,023. Zeolite Beta is yet another large pore crystalline silicate which can be used.

It is within the scope of this invention to employ two or more amorphous and/or large or medium pore crystalline cracking catalysts in this invention. Other preferred large pore crystalline silicate zeolite components can include the synthetic faujasite zeolites X and Y, including zeolites Y, REY, USY and RE-USY.

Preferred medium pore crystalline silicate zeolite catalysts are exemplified by ZSM-5, ZSM-11, ZSM-12, ZSM-18, ZSM-20, ZSM-23, ZSM-34, ZSM-35, ZSM-38, ZSM-48 and other similar materials. ZSM-5 is particularly preferred. See, U.S. Pat. No. 3,702,886 which describes ZSM-5 and is expressly incorporated herein by reference. See also, U.S. Reissue Pat. No. 29,948 describing a crystalline material with an X-ray diffraction pattern of ZSM-5, which is also expressly incorporated herein by reference.

In conducting the catalytic cracking operation, the ring opened naphtha is contacted with a catalytically effective amount of a cracking catalyst under conditions effective to convert the feed to cracked products containing light olefins. The temperature employed ranges from about 400° C. to about 750° C., preferably from about 500° C. to about 750° C. The pressure employed typically ranges from about 0 psig to about 150 psig, preferably from about 0 psig to about 45 psig. Suitably, catalyst-to-oil ratios in the cracking zone used to convert the feed to lower boiling products are not more than about 30:1, and may range from about 20:1 to about 2:1, preferably from about 4:1 to about 9:1.

In a preferred embodiment, catalytic conversion conditions include temperatures from about 525° C. to about 750° C., preferably from about 550° C. to about 750° C., hydrocarbon partial pressures from about 10 to 40 psia, preferably from about 15 to 25 psia; and a catalyst to naphtha (wt/wt) ratio from about 3 to about 12, preferably from about 5 to about 9, where catalyst weight is the total weight of the catalyst composite. Steam may be concurrently introduced with the naphtha stream into the reaction zone, with the steam comprising up to about 50 wt. % of the hydrocarbon feed, preferably up to about 35 wt. %. Also, it is preferred that the naphtha residence time in the reaction zone be less than about 10 seconds, for example from about 1 to 10 seconds, preferably from about 2 to about 6.

The catalytic cracking process may be carried out in a fixed bed, moving bed, ebullated bed, slurry, transfer line (dispersed phase) or fluidized bed operation. Suitable regeneration temperatures include a temperature ranging from about 1100° F. to about 1500° F. (593° C. to 816° C.). Operating pressure typically ranges from about 0 to about 150 psig. An oxidizing agent is used to regenerate the partially deactivated (i.e., coked) catalyst. This agent will generally be an oxygen-containing gas such as air, oxygen and mixtures thereof. The partially deactivated (coked) catalyst is contacted with the oxidizing agent for a time sufficient to remove, by combustion, at least a portion of the carbonaceous deposit and thereby regenerate the catalyst in a conventional manner known in the art.

The cracked product will be high in light olefin content, particularly ethylene and propylene. The product will typically contain from about 1 wt. % to at least about 10 wt. % ethylene and from about 1 wt. % to at least about 10 wt. % propylene. Preferably, the product will contain at least about 15 wt. % ethylene and at least about 15 wt. % propylene, and more preferably at least about 30 wt. % ethylene and at least about 30 wt. % propylene. The product also preferably contains from about 0 wt. % to less than about 30 wt. % aromatics, more preferably less than about 25 wt. % aromatics, and most preferably less than about 20 wt. % aromatics. On the basis of the naphtha feed, a 10 wt. % reduction in ring compounds results in about a 10 wt. % increase in normal paraffin content in the ring opened product and about a 5 wt. % increase in light olefin yield in the cracked product.

The light olefins may be separated from the cracked products for use as feeds for processes such as oligimerization, polymerization, co-polymerization, ter-polymerization, and related processes (collectively referred to herein as "polymerization") in order to form macromolecules. Such light olefins may be polymerized both alone and in combination with other species, in accordance with polymerization methods known in the art. In some cases it may be desirable to separate, concentrate, purify, upgrade, or otherwise process the light olefins prior to polymerization. Propylene and ethylene are preferred polymerization feeds. Polypropylene and polyethylene are preferred polymerization products made therefrom.

The Periodic Table of the Elements referred to herein appears on the inside cover page of the Merck Index, 12th Ed., Merck & Co., 1996.

This invention will be better understood with reference to the following examples, which are intended to illustrate specific embodiments.

EXAMPLE 1

In a ⅜" diameter stainless steel reactor, 4 g of a 0.9 wt. % $Ir/Al_2O_3$ catalyst was placed. On top of the $Ir/Al_2O_3$ catalyst was placed a mixture of 0.5 g of a $Pt/Al_2O_3$ (0.6 $Pt:Al_2O_3$) catalyst and 1 g of a ZnO sorbent. This top mixture was used as a guard bed to protect the $Ir/Al_2O_3$ catalyst from deactivation, but the top mixture is not considered to be necessary to the invention. A light virgin naphtha feed (containing ~0.5 ppm S) was passed through the reactor, the feed first contacting the layer containing the mixture of the $Pt/Al_2O_3$ catalyst and the ZnO sorbent. The conditions in the reactor were as follows: 240° C.; 400 psig; 2000 SCF/B $H_2$; and 0.5 W/H/W. The ring opened product was collected in a dry ice trap to accumulate $C_4$+ material. The $C_4$+ yield was 95 wt. %. Methane yield was 0.7 wt. %. A ring conversion of >95% was achieved. Both the feed and ring opened (R/O) product were analyzed for paraffin, naphthene, and aromatic content. The data is shown in Table 1.

TABLE 1

|  | FEED | R/O PRODUCT |
|---|---|---|
| H Content (calculated) | 15.7 | 16.4 |
| API Gravity | 73.8 | 86.2 |
| Total Paraffins, wt. % | 74.8 | 99.4 |
| Isoparaffins | 30.8 | 45.8 |
| n-paraffins | 44.0 | 53.6 |
| Total Naphthenes, wt. % | 22.5 | 0.6 |
| Total Aromatics, wt. % | 2.7 | 0.0 |

EXAMPLE 2

The light virgin naphtha feed and the ring opened product of Example 1 were run on a catalytic cracking bench unit, using ZCAT 40 from Intercat, a ZSM-5 type catalyst, as the cracking catalyst under the following conditions: 700° C., 12 psig, 0.33 $H_2O$/feed ratio. When compared at constant conversion of ~96%, the ring opened product is ~45% more reactive as indicated by the higher WHSV and results in 20% higher olefin yields than the light virgin naphtha feed. The results are shown in Table 2.

TABLE 2

|  | FEED | R/O PRODUCT |
|---|---|---|
| Conversion | 95.5 | 96.1 |
| WHSV, $hr^{-1}$ | 15 | 22 |
| $C_2^=$ Yield, wt. % | 28.7 | 33.7 |
| $C_3^=$ | 20.9 | 25.3 |
| $C_4^=$ | 4.9 | 6.0 |
| Light Saturates | 23.4 | 23.1 |
| Aromatics | 17.7 | 8.1 |

EXAMPLE 3

A 0.9 Ir catalyst was prepared by impregnating 50 g of reformer grade alumina extrudates with 28 ml of chloroiridic solution containing 16 mg of Ir/ml. The catalyst was dried at 120° C. for 24 hr and reduced at 450° C. for 3 hr. The catalyst was used to ring open 1,2-dimethylcyclohexane (1,2-DMCH) under the following conditions: 300° C., 500 psig, 10 W/H/W, $H_2$/Oil=6. The results are reported in Table 3 and show that 0.9 wt. % $Ir/Al_2O_3$ is active and selective for ring opening naphthenes to paraffins.

EXAMPLE 4

A 100% n-hexane feed was passed over a steamed ZCAT40 catalyst at 710° C., 24 $hr^{-1}$ WHSV and a 0.33 steam/n-hexane ratio. 94.5% of the hexane was converted and the ethylene yield was 29.9 wt. % and the propylene yield was 28.4 wt. %.

EXAMPLE 5

A 70% n-hexane/30% 3-methylpentane feed was passed over a steamed ZCAT40 catalyst at at 710° C., 24 $hr^{-1}$ WHSV and a 0.33 steam/n-hexane ratio. 83.9% of the feed was converted and the ethylene yield was 23.8 wt. % and the propylene yield was 25.3 wt. %.

By comparing examples 4 and 5 it is clear that the feed with a higher level of n-paraffin results in higher conversion and higher olefin yields in the cracking process. It is therefore preferable to have a ring opening process which maximizes the level of n-paraffin, i.e. ring opening at the tertiary carbon sites. When coupled with a downstream cracking process, this preferred ring opening process will result in higher feed conversions and higher light olefin yields.

EXAMPLE 6

The procedure of Example 3 was used to prepare a 0.01Pt-0.9Ir catalyst by impregnating reformer grade alumina extrudates with stock solutions of chloroiridic and chloroplatinic acids (28 mg Pt/ml). The catalyst was dried and reduced as in Example 3. The 0.01Pt-0.9Ir catalyst was used to ring open 1,2-dimethylcyclohexane, and the results appear in Table 3.

EXAMPLE 7

The procedure of Example 3 was used to prepare a 0.05Pt-0.9Ir catalyst by impregnating reformer grade alumina extrudates with stock solutions of chloroiridic and chloroplatinic acids. The catalyst was dried and reduced as in Example 3. The 0.05Pt-0.9Ir catalyst was used to ring open 1,2-dimethylcyclohexane, and the results are shown in Table 3.

EXAMPLE 8

The procedure of Example 3 was used to prepare a 0.1Pt-0.9Ir catalyst by impregnating reformer grade alumina extrudates with stock solutions of chloroiridic and chloroplatinic acids (28 mg Pt/ml). The catalyst was dried and reduced as in Example 3. The 0.1Pt-0.9Ir catalyst was used to ring open 1,2-dimethylcyclohexane, and the results appear in Table 3.

EXAMPLE 9

The procedure of Example 3 was used to prepare a 0.6Pt-0.9Ir catalyst by impregnating reformer grade alumina extrudates with stock solutions of chloroiridic and chloroplatinic acids (28 mg Pt/ml). The catalyst was dried and reduced as in Example 3. The 0.06Pt-0.9Ir catalyst was used to ring open 1,2-dimethylcyclohexane, and the results are shown in Table 3.

EXAMPLE 10

The procedure of Example 3 was used to prepare a 0.9Pt-0.9Ir catalyst by impregnating reformer grade alumina extrudates with stock solutions of chloroiridic and chloroplatinic acids (28 mg Pt/ml). The catalyst was dried and reduced as in Example 3. The 0.9Pt-0.9Ir catalyst was used to ring open 1,2-dimethylcyclohexane, and the results appear in Table 3.

EXAMPLE 11

The procedure of Example 3 was used to prepare a 1.3Pt-0.9Ir catalyst by impregnating reformer grade alumina extrudates with stock solutions of chloroiridic and chloroplatinic acids (28 mg Pt/ml). The catalyst was dried and reduced as in Example 3. The 1.3Pt-0.9Ir catalyst was used to ring open 1,2-dimethylcyclohexane, and the results appear in Table 3.

TABLE 3

(300° C.; 500 psig; 10 W/H/W; $H_2$/Oil = 6)

| Example | Catalyst | $C_8$ paraffin ring opening yield, wt. % | wt. % n-octane/wt. % $C_8$ paraffin yield, % |
|---|---|---|---|
| 3 | 0.9 Ir | 20 | 10 |
| 6 | 0.01 Pt-0.9 Ir | 34 | 18 |
| 7 | 0.05 Pt-0.9 Ir | 33 | 17 |
| 8 | 0.1 Pt-0.9 Ir | 24 | 17 |
| 9 | 0.6 Pt-0.9 Ir | 16 | 16 |
| 10 | 0.9 Pt-0.9 Ir | 10 | 17 |
| 11 | 1.3 Pt-0.9 Ir | 7 | 18 |

The data reveal a substantial increase in the % n-octane product distribution for the more preferred Pt—Ir catalysts of this invention over the preferred Ir only catalyst of Example 3. The degree of improvement is independent of catalyst composition over the range 0.1Pt-1.3Pt. The increase in both $C_8$ paraffin yield and % n-octane product distribution at the low Pt loadings of Examples 6, 7, and 8 highlights the added value of these more preferred bimetallic catalysts.

EXAMPLE 12

A 0.1Rh-0.9Ir catalyst was prepared as described in Example 8 by substituting a Rh stock solution for Pt. The catalyst was used to ring open 1,2-dimethylcyclohexane. The results are shown in Table 4 and compared to that of Examples 3 and 8.

TABLE 4

(300° C.; 500 psig; 10 W/H/W; $H_2$/Oil = 6)

| Example | Catalyst | $C_8$ paraffin ring opening yield, wt. % | Wt.% n-octane/ wt. % $C_8$ paraffin yield % |
|---|---|---|---|
| 3 | 0.9 Ir | 20 | 10 |
| 8 | 0.1 Pt-0.9 Ir | 24 | 17 |
| 12 | 0.1 Rh-0.9 Ir | 26 | 17 |

EXAMPLE 13

A Ba modified alumina was prepared by the addition of a solution of barium nitrite in water to reforming grade alumina extrudates. The Ba/$Al_2O_3$ was dried at 120° C. for 24 hr and then calcined in air at 600° C. for 20 hr. The Ba content of the alumina was 5 wt. %. A 0.9Ir catalyst was prepared on the Ba/$Al_2O_3$ by incipient wetness by the addition of 14 ml of Ir stock solution and 10 ml of water to 25 g of the Ba support. The catalyst was dried at 120° C. for 24 hr and reduced in hydrogen at 450° C. for 3 hr. The catalyst was used to ring open 1,2-dimethylcyclohexane as in Example 3. The results are shown in Table 5.

EXAMPLE 14

The procedure of Example 13 was used to prepare a 0.1Pt-0.9Ir/Ba/$Al_2O_3$ catalyst, which was used to ring open 1,2-dimethylcyclohexane as in Example 8. The results are summarized in Table 5.

EXAMPLE 15

The procedure of Example 13 was used to prepare a 0.9Pt-0.9Ir/Ba/$Al_2O_3$ catalyst, which was used to ring open 1,2-dimethylcyclohexane as in Example 10. The results are summarized in Table 5.

TABLE 5

(300° C.; 500 psig; 10 W/H/W; H$_2$/Oil = 6)

| Example | Catalyst | C$_8$ paraffin ring opening yield, wt. % | Wt. % n-octane/ wt. % C$_8$ paraffin yield, % |
|---|---|---|---|
| 3 | 0.9 Ir | 20 | 10 |
| 8 | 0.1 Pt-0.9 Ir | 24 | 17 |
| 10 | 0.9 Pt-0.9 Ir | 10 | 17 |
| 13 | 0.9 Ir/Ba | 14 | 19 |
| 14 | 0.1 Pt-0.9 Ir/Ba | 11 | 20 |
| 15 | 0.9 Pt-0.9 Ir/Ba | 10 | 15 |

Examples 6–15 show how ring opening catalysts can be modified to increase % n-octane product distribution in 1,2-dimethylcyclohexane ring opening and thus increase naphtha n-paraffin content. Higher n-paraffin content in the feed to a cracking catalyst leads to higher olefin yields as shown in Examples 1, 2, 4, and 5.

Having now fully described this invention, it will be appreciated by those skilled in the art that the invention can be performed within a wide range of parameters within what is claimed, without departing from the spirit and scope of the invention.

What is claimed is:

1. A method for converting a naphtha feed boiling in the range of about 0° C. to about 230° C. and containing naphthene ring-containing compounds, comprising:
    a) contacting the naphtha feed with a catalytically effective amount of a ring opening catalyst capable of opening a ring at a tertiary carbon site under effective ring opening conditions to form a ring opened product wherein said ring opening catalyst contains at least one of Ru, Rh, Ir, and Pt on an inorganic refractory oxide support; and
    b) contacting said ring opened product with a catalytically effective amount of a cracking catalyst under effective conditions, including temperatures from about 400° C. to about 750° C., to form a product containing olefins.

2. The method of claim 1 wherein the supported naphthene ring opening catalyst further comprises at least one of an alkali or alkaline earth metal.

3. The method of claim 1 wherein Ir is present in an amount ranging from about 0.3 to about 2.0 wt. %, based on the total weight of the ring opening catalyst.

4. The method of claim 3 wherein the catalyst is a polymetallic catalyst wherein the Ir is combined with at least one of Pt, Ru, and Rh present in an amount ranging from about 0.001 to about 2.0 wt. %, based on the total weight of the ring opening catalyst.

5. The method of claim 4, wherein Ir is combined with Pt.

6. The method of claim 2 wherein the alkaline earth metal is barium.

7. The method of claim 1, wherein ring opening is carried out at a temperature of from about 150° C. to about 400° C.

8. The method of claim 1, wherein ring opening is carried out at a total pressure from about 0 to about 3,000 psig.

9. The method of claim 1, wherein ring opening is carried out at a liquid hourly space velocity of from about 0.1 to about 10 V/V/Hr.

10. The method of claim 1, wherein ring opening is carried out at a hydrogen treat gas rate of from about 500 to about 10,000 standard cubic feet per barrel.

11. The method of claim 1, wherein the naphtha feed's sulfur content is less than about 1 ppm.

12. The method of claim 1, wherein the cracking catalyst comprises a large or medium pore zeolite.

13. A method for producing an olefin product from a naphtha feed boiling in the range of about 0° C. to about 230° C. and containing naphthene ring-containing compounds, comprising:
    a) contacting the naphtha feed with a first catalytically effective amount of a ring opening catalyst capable of opening the naphthene ring-containing compounds at a tertiary carbon site at a temperature ranging from about 225° C. to about 350° C., a total pressure ranging from about 100 to about 800 psig, a liquid hourly space velocity ranging from about 0.5 to about 5 v/v/h, and a hydrogen treat gas rate ranging from about 500 to about 3000 scf/bbl, in order to form a ring opened product having at least 90 wt. % normal paraffin, based on the total weight of the product, the ring-opening catalyst containing
        i) at least one of Ir, Pt, Rh, and Ru on
        ii) an alumina support containing at least one of an alkali and alkaline-earth metal;
    b) contacting said ring opened product in a catalytic cracking zone with a catalyst containing ZSM-5 at a temperature ranging from about 500° C. to about 700° C., a pressure ranging from about 0 to about 45 psig, and at a catalyst-to-oil ratio in the cracking zone ranging from about 4:1 to about 9:1 in order to form a cracked product;
    c) separating from said cracked product a polymerization feed of at least one of ethylene and propylene.

14. The method of claim 13 further comprising polymerizing said polymerization feed in order to form a polymer.

* * * * *